United States Patent
Katoh et al.

(10) Patent No.: US 7,220,466 B2
(45) Date of Patent: May 22, 2007

(54) LIQUID CRYSTAL COMPOSITION AND LIQUID CRYSTAL DEVICE

(75) Inventors: Takashi Katoh, Minami-ashigara (JP); Koji Takaku, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/221,828

(22) Filed: Sep. 9, 2005

(65) Prior Publication Data

US 2006/0054860 A1 Mar. 16, 2006

(30) Foreign Application Priority Data

Sep. 10, 2004 (JP) .............................. 2004-263568

(51) Int. Cl.
*C09K 19/52* (2006.01)
*C09K 19/60* (2006.01)

(52) U.S. Cl. .................. 428/1.1; 428/1.3; 252/299.01; 252/299.1

(58) Field of Classification Search ................ 428/1.1, 428/1.31, 1.3; 252/299.01, 299.1
See application file for complete search history.

(56) References Cited

U.S. PATENT DOCUMENTS 5,006,276 A * 4/1991 Kaneko et al. ........... 252/299.1
5,621,552 A * 4/1997 Coates et al. ................ 349/86
6,486,928 B1 * 11/2002 Lin et al. ..................... 349/16
6,538,714 B1 * 3/2003 Sahouani et al. ........... 349/194
6,574,044 B1 * 6/2003 Sahouani et al. ........... 359/498

FOREIGN PATENT DOCUMENTS

EP 103095 * 3/1984
JP 2004-117453 * 4/2004

OTHER PUBLICATIONS

English translation by computer for JP 2004-117453, http://www4.ipdl.ncipi.go.jp/Tokujitu/PAJdetail.ipdl?N0000=60&N0120=01&N2001=2&N3001=2004-117453.*
English abstrat for EP 103095 by Derwent*
English abstract for JP 2004-117453.*
Bücher et al., "Frequency-addressed liquid crystal filed effect", Applied Physics Lettters, Aug. 15, 1974, pp. 186-188, vol. 25, No. 4.
Coates et al., "A Variable Tilt Smectic A Electro-optic Effect Giving Stored Colours", Mol. Cryst. Liq. Cryst., vol. 41 (Letters), pp. 151-154.

* cited by examiner

*Primary Examiner*—Shean C Wu
(74) *Attorney, Agent, or Firm*—Buchanan Ingersoll & Rooney PC

(57) ABSTRACT

A novel liquid crystal composition is disclosed. The liquid crystal composition comprises at least one dual-frequency switchable smectic liquid crystal, and at least one dichroic dye. And a novel liquid crystal device is also disclosed. The device comprises a pair of electrodes of which at least one is a transparent electrode, and a liquid crystal layer between the pair of electrodes comprising a liquid crystal composition comprising at least one dual-frequency switchable smectic liquid crystal, and at least one dichroic dye.

15 Claims, No Drawings

LIQUID CRYSTAL COMPOSITION AND LIQUID CRYSTAL DEVICE

CROSS-REFERENCE TO RELATED APPLICATIONS

This application claims benefit of priority under 35 USC 119 to Japanese Patent Application No. 2004-263568 filed Sep. 10, 2004.

TECHNICAL FIELD OF THE INVENTION

The present invention relates to a liquid crystal composition and a liquid crystal device comprising a liquid crystal layer containing the liquid crystal composition, and, more particularly, to a liquid crystal device advantageously usable in a liquid crystal device employing a guest-host (hereinafter occasionally referred to as GH) mode.

RELATED ART

With dissemination of digital information, importance of a display for displaying digital information (hereinafter referred to as "electronic paper") has been growing. Electronic papers are required to have a high level of visibility and a low consumption of electric power. A high level of visibility means a white background close to paper, and, for this purpose, there is preferred a manner based on a scattering white background similar to that in case of paper. Also a reflective displaying manner is advantageous from view of lower consumption of electric power, in comparison with a self-light-emitting display manner. Various manners have been proposed for the electronic paper, such as a reflective liquid crystal displaying, an electrophoretic displaying, a magnetophoretic displaying, a dichroic gyrating ball, an electrochromic displaying and a leucothermal displaying manners. However, none of these manners gives a high level of visibility as required, and an improvement has been desired.

Various types of liquid crystal device (liquid crystal display device) have already been proposed, among which a liquid crystal device employing GH mode is capable of highlight display and is expected as a reflective display. The liquid crystal device employing a GH mode usually comprises a cell filled with a liquid crystal composition, prepared by dissolving a dichroic dye in a nematic liquid crystal, and when a voltage is applied to the cell sufficient to rotate the liquid crystal molecules, the dye molecules rotate along with the liquid crystal molecules and allow changing of light absorption by the cell to thereby effect display. Such a liquid crystal device employing a GH mode, can display images without polarizing plates, is expected as a brighter display in comparison with the prior liquid crystal displays comprising polarizing plates. Also a switching of the liquid crystal device is generally achieved by a change in the alignment of liquid crystal by an on/off operation of the electric field, and, however, according to such a switching manner, a response speed is sometimes slow.

On the other hand, there is known "a dual-frequency switching manner". In the manner, dual-frequency liquid crystal, of which dielectric anisotropy $\Delta\epsilon$ changes from positive to negative when the frequency of the applied voltage is increasing, is utilized, and a reversible alignment change of the liquid crystal is carried out by switching frequencies of an electric field to be applied to the liquid crystal (for example cf. Applied Physics Letters, Vol. 25, No. 4, 186–188 (1974)). According to this manner, the liquid crystal molecules change their alignment actively rather than passively, and, thus, the response speed becomes faster. And such a manner has been employed in projectors. Dual-frequency smectic liquid crystal is disclosed in Mol. Cryst. Liq. Cryst., Vol. 49, p. 83–87 (1978). However, in the document, there is no description regarding a GH mode.

SUMMARY OF THE INVENTION

One object of the present invention is to provide a liquid crystal composition useful for producing a liquid crystal device exhibiting a high level of visibility and a high contrast, and to provide a liquid crystal device exhibiting a high visibility and a high contrast.

It is known that the contrast of a liquid crystal device, employing a GH mode, varies depending on an order parameter of the dichroic dye used in a liquid crystal layer, a type of the host liquid crystal used in a liquid crystal layer or a structure of the cell. Generally, using a liquid crystal composition comprising a dichroic dye and a nematic liquid crystal, it is difficult to improve the contrast because the degree of order of the nematic phase is low. The degree of order of a smectic phase, in usual, is higher than that of a nematic phase, and, however, the alignment of such a smectic phase cannot be controlled easily with practical power voltage, in comparison with the alignment of a nematic phase. The inventors conducted various studies, and, as a result, they found that it is possible to develop an optical shutter and to obtain unpredictable effects such as improvement of contrast by using a dual-frequency switchable liquid crystal containing a dichroid dye. On the basis of these findings, the present invention was achieved.

In one aspect, the present invention provides a liquid crystal composition comprising:

at least one dual-frequency switchable smectic liquid crystal, and at least one dichroic dye.

The dichroic dye preferably has at least one substituent represented by a formula (1):

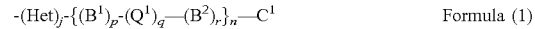

$$-(Het)_j-\{(B^1)_p-(Q^1)_q-(B^2)_r\}_n-C^1 \qquad \text{Formula (1)}$$

where Het represents an oxygen atom or a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by $B^1$ and $B^2$ in the formula (1) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p-(Q^1)_q-(B^2)_r\}$ present in two or more units may be same or different to each other.

The dichroic dye may be selected from the group represented by a formula (2) or formula (3):

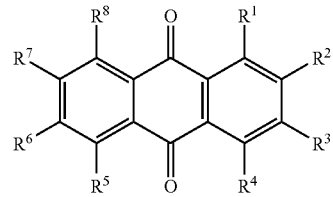

Formula (2)

In the formula, $R^1$ represents a substituent represented by $-S-\{(B^1)_p-(Q^1)_q-(B^2)_r\}_n-C^1$, in which S represents a sulfur atom, and $B^1$, $B^2$, $Q^1$, p, q, r and n have respectively same definitions as in the formula (1); and $R^2$, $R^3$, $R^4$, $R^5$, $R^6$, $R^7$ and $R^8$ respectively represent a hydrogen atom or a substituent.

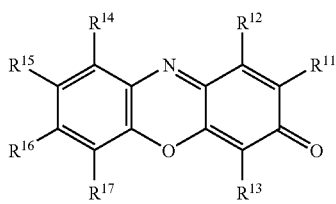

Formula (3)

In the formula, $R^{11}$, $R^{12}$, $R^{13}$, $R^{14}$, $R^{15}$, $R^{16}$, and $R^{17}$ respectively represent a hydrogen atom or a substitutent, provided that at least one represents a substituent represented by —S—{$(B^1)_p$-$(Q^1)_q$—$(B^2)_r$}n—$C^1$, in which S represents a sulfur atom, and $B^1$, $B^2$, $Q^1$, p, q, r and n have respectively same definitions as in the formula (1).

As embodiments of the present invention, the liquid crystal composition wherein the dual-frequency switchable smectic liquid crystal exhibits a smectic A phase; and the liquid crystal composition wherein {$(B^1)_p$-$(Q^1)_q$—$(B^2)_r$}—$C^1$ is a substituent represented by a formula (a-1) or a formula (a-2);

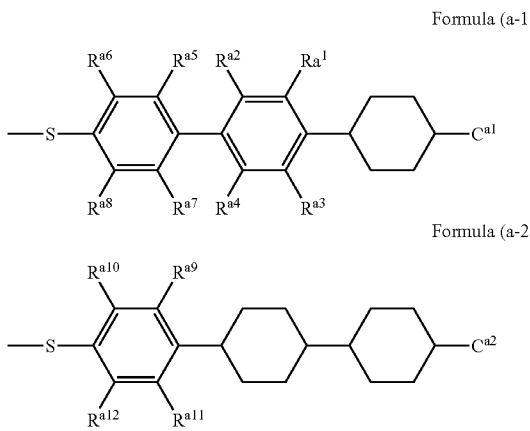

Formula (a-1)

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group; are provided.

In another aspect, the present invention provides a liquid crystal device comprising:

a pair of electrodes of which at least one is a transparent electrode, and a liquid crystal layer between the pair of electrodes comprising a liquid crystal composition comprising at least one dual-frequency switchable smectic liquid crystal, and at least one dichroic dye.

DETAILED DESCRIPTION OF THE INVENTION

Hereafter, the present invention will be explained in detail. In the specification, ranges indicated with "to" mean ranges including the numerical values before and after "to" as the minimum and maximum values.

A liquid crystal composition of the present invention comprises at least a dual-frequency switchable liquid crystal amd at least one dichroic dye. In the following, there will be explained various material to be employed in the present invention.

In the present invention, a dichroic dye is defined as a compound capable of being dissolved in a host liquid crystal and having a function of absorbing light. The dichroic dye used in the present invention may have any absorption maximum and an absorption band, but preferably has an absorption maximum in a yellow region (Y), a magenta region (M) or a cyan region (C). Also the dichroic dye may be employed singly or in a mixture of plural types. In case of mixing plural dyes, a mixture of dichroic dyes having an absorption maximum in Y, M or C is preferably employed. Also a method of obtaining a full-color display by mixing a yellow dye, a magenta dye and a cyan dye is described in detail in "Color Chemistry", Sumio Tokita, Maruzen (1982). The yellow region, magenta region and cyan region mentioned above respectively mean a region of 430 to 490 nm, a region of 500 to 580 nm and a region of 600 to 700 nm.

The dichroic dye may be selected from compounds having any chromophoric group. Examples of the chromophoric group include azo dye residues, anthraquinone dye residues, perylene dye residues, merocyanine dye residues, azomethyne dye residues, phtaloperylene dye residues, indigo dye residues, azulene dye residues, dioxazine dye residues, polythiophene dye residues and phenoxazine dye residues. Among these, azo dye residues, anthraquinone dye residues and phenoxazine dye residues are preferred, and anthraquinone dye residues and phenoxazine dye, such as phenoxazine-3-one, residues are more preferred.

Examples of the azo dye include monoazo, diazo, trisazo, tetrakisazo and pentakisazo dyes. Among these, monoazo, bisazo or trisazo dyes are preferred.

The azo dye may contain any ring such as an aromatic ring (for example, benzene ring or naphthalene ring) and a hetero ring (for example, quinoline ring, pyridine ring, thiazole ring, benzothiazole ring, oxazole ring benzoxazole ring, imidazole ring, bennzoimidazole ring or pyrimidine ring).

The anthraquinone dye desirably has at least one substituent containing an oxygen atom, a sulfur atom or a nitrogen atom, such as an alkoxy group, an aryloxy group, an alkylthio group, an arylthio group, an alkylamino group or an arylamino group. The number of the substituents included in the anthraquinone dye is not limited to any range, and, in general, disubstituted, trisubstituted or tetrakissubstituted anthraquinone dyes are preferred, and disubstituted or trisubstituted anthraquinone dyes are more preferred. The substituents may bond to any position of anthraquinone rings, and, in general, 1,4-disubstituted, 1,5-disubstituted, 1,4,5-trisubstituted, 1,2,4-trisubstituted, 1,2,5-trisubstituted, 1,2,4,5-tetrasubstituted and 1,2,5,6-tetrasubstituted anthraquinone dyes are preferred.

The phenoxazine dye such as phenoxazine-3-one desirably has at least one substituent containing an oxygen atom, a sulfur atom or a nitrogen atom, such as an alkoxy group, an aryloxy group, an alkylthio group, an arylthio group, an alkylamino group or an arylamino group.

The dichroic dye desirably has at least one substituent represented by a formula (1).

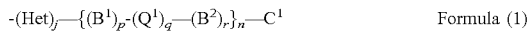

Formula (1)

In the formula, Het represents an oxygen atom or a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; j represents 0 or 1, p, q and r respectively represent an integer from 0 to 5; and n represents an integer from 1 to 3, provided that a total number of groups represented by $B^1$ and $B^2$ in the formula (1) is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q\text{---}(B^2)_r\}$ present in two or more units may be same or different to each other.

Het represents an oxygen atom or a sulfur atom, and preferably a sulfur atom.

$B^1$ and $B^2$ respectively represent a substituted or non-substituted arylene group, heteroarylene group or divalent cyclic aliphatic hydrocarbon group.

The arylene group represented by $B^1$ or $B^2$ is desirably selected from $C_{6-20}$ arylene group. Preferred examples of the arylene group include divalent residues of substituted or non-substituted benzene, substituted or non-substituted naphthalene and substituted or non-substituted anthracene. Divalent residues of benzene or substituted benzene are more preferred and 1,4-phenylene is especially preferred. The heteroarylene group represented by $B^1$ or $B^2$ is desirably selected from $C_{1-20}$ heteroarylene group. Preferred examples of the heteroarylene group include divalent residues of pyridine, quinoline, isoquinoline, pyrimidine, pyrazine, thiophene, furan, oxazole, thiazole, imidazole, pyrazole, oxadiazole, thiadiazole, triazole and heteroaryl ring condensed one kind of rings or two or more kinds of rings selected therefrom. The divalent cyclic aliphatic hydrocarbon group represented by $B^1$ or $B^2$ is desirably selected from the group consisting of cyclohexane-1,2-diyl, cyclohexane-1,3-diyl, cyclohexane-1,4-diyl and cyclopentane-1,3-diyl, and is more desirably (E)-cyclohexane-1,4-diyl.

The arylene group, heteroarylene group or divalent cyclic aliphatic hydrocarbon represented by $B^1$ or $B^2$ may have a substituent, and the substituent is desirably selected from Substituent Group V shown below.

(Substituent Group V)

Halogen atom such as chlorine, bromine, iodine or fluorine; a mercapto group, a cyano group, a carboxyl group, a phosphoric acid group, a sulfonic acid group, a hydroxy group, a $C_{1-10}$, desirably $C_{2-8}$ and more desirably $C_{2-5}$ carbamoyl group such as methylcarbamoyl, ethylcarbamoyl or morpholinocarbamoyl; a $C_{0-10}$, desirably $C_{2-8}$ and more desirably $C_{2-5}$ sulfamoyl group such as methylsulfamoyl, ethylsulfamoyl or piperidinosulfamoyl; a nitro group; a $C_{1-20}$, desirably $C_{1-10}$ and more desirably $C_{1-8}$ alkoxy group such as methoxy, ethoxy, 2-methoxyethoxy or 2-phenylethoxy; a $C_{6-20}$, desirably $C_{6-12}$ and more desirably $C_{6-10}$ aryloxy group such as phenoxy, p-methylphenoxy, p-chlorophenoxy or naphthoxy; a $C_{1-20}$, desirably $C_{2-12}$ and more desirably $C_{2-8}$ acyl group such as acetyl, benzoyl or trichloroacetyl; a $C_{1-20}$, desirably $C_{2-12}$ and more desirably $C_{2-8}$ acyloxy group such as acetyloxy or benzoyloxy; a $C_{1-20}$, desirably $C_{2-12}$ and more desirably $C_{2-8}$ acylamino group such as acetylamino; a $C_{1-20}$, desirably $C_{1-10}$ and more desirably $C_{1-8}$ sulfonyl group such as methanesulfonyl, ethanesulfonyl or benzenesulfonyl; a $C_{1-20}$, desirably $C_{1-10}$ and more desirably $C_{1-8}$ sulfonyl group such as methanesulfonyl, ethanesulfonyl or benzenesulfonyl; a $C_{1-20}$, desirably $C_{1-12}$ and more desirably $C_{1-8}$ substituted or non-substituted amino group such as non-substituted amino, methylamino, dimethylamino, benzylamino, anilino, diphenylamino, 4-methyphenylamino, 4-ethylphenylamino, 3-n-propylphenylamino, 4-n-propylphenylamino, 3-n-butylphenylamino, 4-n-butylphenylamino, 3-n-pentylpehnylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino, N,N-ethylphenylamino; a $C_{0-15}$, desirably $C_{1-10}$ and more desirably $C_{3-6}$ ammonium group such as trimethylammonium or triethylammonium; a $C_{0-15}$, desirably $C_{-1-10}$ and more desirably $C_{1-6}$ hydrazino group such as trimethylhydrazino; a $C_{1-15}$, desirably $C_{1-10}$ and more desirably $C_{1-6}$ ureido group such as non-substituted ureido or N,N-dimethylureido; a $C_{1-15}$, desirably $C_{1-10}$ and more desirably $C_{1-6}$ imido group such as succinimido; a $C_{1-20}$, desirably $C_{1-12}$ and more desirably $C_{1-8}$ alkylthio group such as methylthio, ethylthio or propylthio; a $C_{6-80}$, desirably $C_{6-40}$ and more desirably $C_{6-30}$ arylthio group such as phenylthio, p-methylphenylthio, p-chlorophenylthio, 2-pyridylthio, 1-naphthylthio, 2-naphthylthio, 4-propylcyclohexyl-4'-diphenylthio, 4-butylcyclohexyl-4'-diphenylthio, 4-pentylcyclohexyl-4'-diphenylthio, or 4-propylphenyl-2-ethynyl-4'-diphenylthio; a $C_{1-80}$, desirably $C_{1-40}$ and more desirably $C_{1-30}$ heteroarylthio group such as 2-pyridylthio, 3-pyridylthio, 4-pyridylthio, 2-quinolylthio, 2-frylthio, 2-pyrrolylthio; a $C_{2-20}$, desirably $C_{2-12}$ and more desirably $C_{2-8}$ alkoxycarbonyl group such as methoxycarbonyl, ethoxycarbonyl or 2-benzyloxycarbonyl; a $C_{6-20}$, desirably $C_{6-12}$ and more desirably $C_{6-10}$ aryloxycarbonyl group such as phenoxycarbonyl; a $C_{1-18}$, desirably $C_{1-10}$ and more desirably $C_{1-15}$ non-substituted alkyl group such as methyl, ethyl, propyl or butyl; a $C_{1-18}$, desirably $C_{1-10}$ and more desirably $C_{1-5}$ substituted alkyl group such as hydroxylmethyl, trifluoromethyl, benzyl, carboxyethyl, ethoxycarbonylethyl or acetylamino methyl, of which examples also include a $C_{2-18}$ (desirably $C_{3-10}$ and more desirably $C_{3-5}$) unsaturated hydrocarbon group such as vinyl, ethynyl, 1-cyclohexenel, benzylidine or benzylidene; a $C_{6-20}$, desirably $C_{6-15}$ and more desirably $C_{6-10}$ substituted or non-substituted aryl group such as phenyl, naphthyl, p-carboxyphenyl, p-nitrophenyl 3,5-dichlorophenyl, p-cyanophenyl, m-fluorophenyl, p-tolyl, 4-propylcyclohexyl-4'-diphenyl, 4-butylcyclohexyl-4'-diphenyl, 4-pentylcyclohexyl-4'-diphenyl or 4-propylphenyl-2-ethyl-4'-diphenyl; and a $C_{1-20}$, desirably $C_{2-10}$ and more desirably $C_{4-6}$ substituted or non-substituted heteroaryl group such as pyridyl, 5-methylpyridyl, thienyl, furyl, morpholino or tetrahydrofurfuryl.

The rings such as benzene or naphthalene ring included in the substituents exemplified above may be condensed with other rings.

Among these, as a substituent of $B^1$ or $B^2$, the exemplified alkyl group, aryl group, alkoxy group, aryloxy group, halogen atom, non-substituted amino, substituted amino group, hydroxy, alkylthio group and arylthio group are preferred, and the exemplified alkyl group, aryl group or halogen atom are preferred.

$Q^1$ is a divalent linking group. $Q^1$ may consist of at least one atom selected from carbon atom, nitrogen atom, oxygen atom or sulfur atom. Examples of the divalent linking group include $C_{0-60}$ divalent linking groups consisting of one or a combination of two or more selected from a $C_{1-20}$ alkylene group such as methylene, ethylene, propylene, butylene, pentylene or cyclohexyl-1,4-diyl, a $C_{2-20}$ alkenylene group such as ethenylene, a $C_{2-20}$ alkynylene such as ethynylene, an amido group (—NH—), an ether group (—O—), an ester group (—COO—), a sulfonamide group (—SO$_2$NH—), a sulfonate group (—SO$_3$—), a ureido group (—NH—CO—NH—), a sulfonyl group (—SO$_2$—), a sulfonyl group (—SO—), a thioether group (-s-), a carbonyl group (—CO—), —NR— (where R is a hydrogen atom, an alkyl group or an aryl group), an azo group (—N$_2$—), an azoxy group (—N$_2$(O)—) and a divalent heterocyclic group such as piperazine-1,4-diyl. Q$^1$ is desirably an alkylene group, an alkenylene group, an alkynylene group, an ether group, a thioether group, an amido group, an ester group, a carbonyl group or a combination thereof. Q$^1$ may carry a substituent selected from the substituent group V described above.

C$^1$ represents an optionally substituted alkyl group, an optionally substituted cycloalkyl group, an optionally substituted alkoxy group, an optionally substituted alkoxycarbonyl group, an optionally substituted acyl group or an optionally substituted acyloxy group. Preferred examples of C$^1$ include a C$_{1-30}$, desirably C$_{1-12}$ and more desirably C$_{1-8}$ alkyl and cycloalkyl group such as methyl, ethyl, propyl, i-propyl, butyl, i-butyl, s-butyl, t-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl or benzyl; a C$_{1-20}$, desirably C$_{1-10}$ and more desirably C$_{1-8}$ alkoxy group such as methoxy, ethoxy, 2-methoxyethoxy or 2-phenylethoxy; a C$_{1-20}$, desirably C$_{2-12}$ and more desirably C$_{2-8}$ acyloxy group such as acetyloxy or benzoyloxy; a C$_{1-30}$, desirably C$_{1-12}$ and more desirably C$_{1-8}$ acyl group such as formyl, acetyl pivaloyl, 2-chloroacetyl, stearoyl, benzoyl or p-n-octyloxyphenylcarbonyl; and a C$_{2-20}$, desirably C$_{2-12}$ and more desirably C$_{2-8}$ alkoxycarbonyl group such as methoxycarbonyl, ethoxycarbonyl or 2-benzyloxycarbonyl. C$^1$ is desirably selected from a substituted or non-substituted alkyl group, a substituted or non-substituted cycloalkyl group or a substituted or non-substituted alkoxy group, and more desirably selected from ethyl, propyl, butyl, pentyl, hexyl, or trifluoromethoxy. C$^1$ may carry a substituent selected from the substituent group V described above.

In the formula, j is 0 or 1, and preferably 0.

In the formula, p, q and r respectively represents an integer from 0 to 5 and n is an integer from 1 to 3, satisfying 3☐(p+r)×n☐10. Or in other words, the total numbers of B$^1$ and B$^2$ included in the formula is 3 to 10 (thinking about the case that n is 2 or more and p and r are different to each other, for example, thinking about the case of n=2, there are two p, one of them being p$^1$ and another being p$^2$, and two r, one of them being r$^1$ and another being r$^2$, the value of (p$^1$+r$^1$+p$^2$+r$^2$) should fall within the range from 3 to 10.

Preferred combinations of p, q and r are (i) to (ix) as shown below:
(i) P=3, q=0, r=0 and n=1;
(ii) P=4, q=0, r=0 and n=1;
(iii) P=5, q=0, r=0 and n=1;
(iv) P=2, q=0, r=1 and n=1;
(v) P=2, q=1, r=1 and n=1;
(vi) P=1, q=1, r=2 and n=1;
(vii) P=3, q=1, r=1 and n=1;
(viii) P=2, q=0, r=2 and n=1;
(ix) P=1, q=1, r=1 and n=2;
(x) P=2, q=1, r=1 and n=2;

Especially preferred combinations are (i) P=3, q=0, r=0 and n=1; (iv) P=2, q=0, r=1 and n=1; and (v) P=2, q=1, r=1 and n=1.

The substituent represented by the formula of —{(B$^1$)$_p$-(Q$^1$)$_q$—(B$^2$)$_r$}$_n$—C$^1$ preferably containing structures exhibiting liquid crystallinity. The structures may exhibit any kind of liquid crystallinity, however, preferably nematic, smectic, or discotic liquid crystallinity, more preferably nematic liquid crystallinity.

Specific examples of the substituent represented by the formula of —{(B$^1$)$_p$-(Q$^1$)$_q$—(B$^2$)$_r$}$_n$—C$^1$ will be listed below, which by no means restricts the present invention. In the following formulae, wave lines denote portions of bonding to Het.

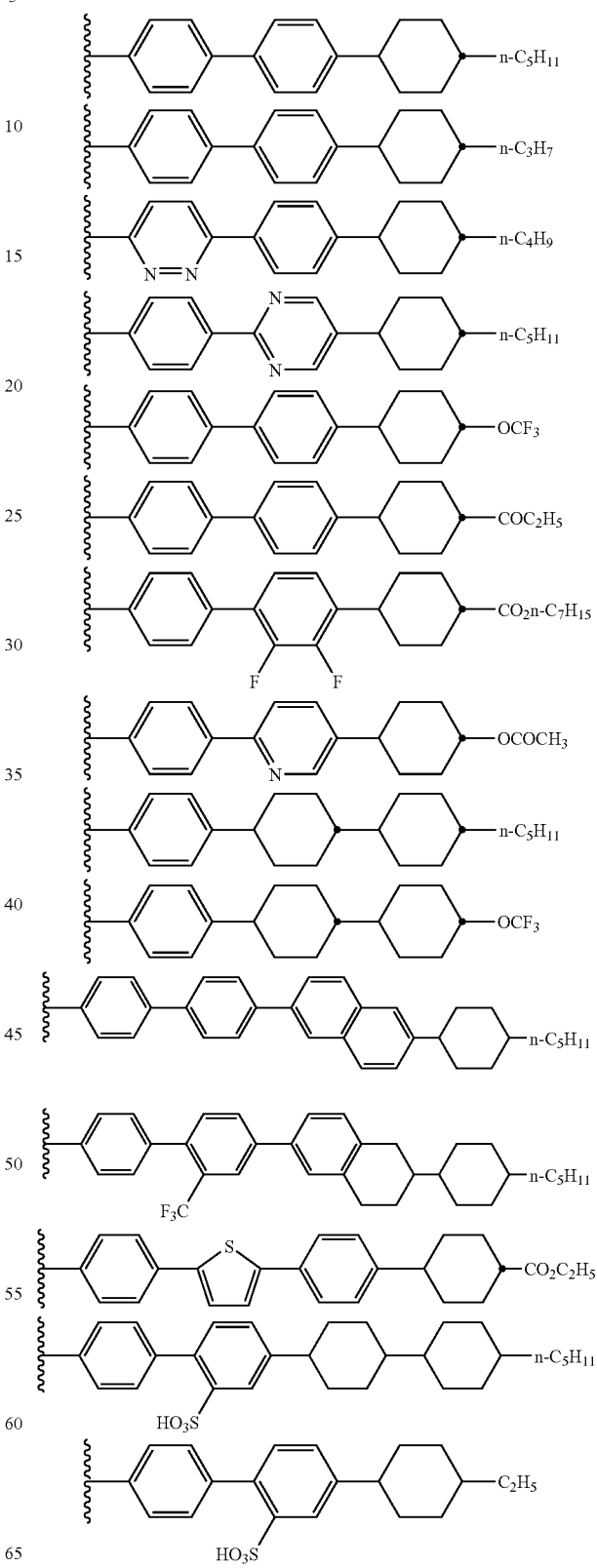

The dichroic dye to be used in the present invention desirably has at least one, more desirably 1 to 8, much more desirably 1 to 4 and further much more desirably 1 or 2 substituents represented by the formula (1), "-(Het)$_j$—{(B$^1$)$_p$-(Q$^1$)$_q$—(B$^2$)$_r$}$_n$—C$^1$".

One of preferred examples of the substituent represented by the formula (1) is a substituent represented by the formula in which Het is a sulfur atom, B$^1$ is a substituted or non-substituted arylene or heteroarylene group, B$^2$ is a cyclohexane-1,4-diyl group, C$^1$ is a substituted or non-substituted alkyl group, j=1, p=2, q=0, r=1 and n=1; and another preferred example of the substituent is a substituent represented by the formula in which Het is a sulfur atom, B$^1$ is a substituted or non-substituted arylene or heteroarylene group, B$^2$ is a cyclohexane-1,4-diyl group, C$^1$ is a substituted or non-substituted alkyl group, j=1, p=1, q=0, r=2 and n=1. One of especially preferred examples of the substituent is a substituent represented by a formula (a-1) shown below, or, in other words, a substituent represented by the formula in which Het is a sulfur atom, B$^1$ is a substituted or non-substituted 1,4-phenylen group, B$^2$ is a trans-cyclohexyl group, C$^1$ is a substituted or non-substituted alkyl group (preferably methyl, ethyl, propyl, butyl, pentyl or hexyl), j=1, p=2, q=0, r=1 and n=1; and another especially preferred example of the substituent is a substituent represented by a formula (a-2), or, in other words, a substituent represented by the formula in which Het is a sulfur atom, B$^1$ is a substituted or non-substituted 1,4-phenylene group, B$^2$ is a trans-cyclohexane-1,4-diyl group, C$^1$ is a substituted or non-substituted alkyl group (preferably methyl, ethyl, propyl, butyl, pentyl or hexyl), j=1, p=1, q=0, r=2 and n=1.

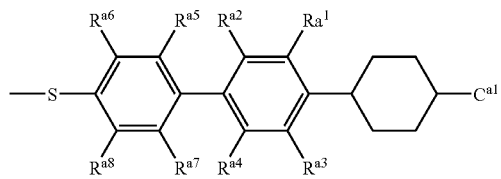

Formula (a-1)

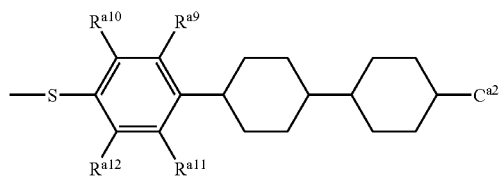

Formula (a-2)

In the formulae, R$^{a1}$ to R$^{a2}$ respectively represent a hydrogen atom or a substituent. The substituent is selected from Substituent Group V described above. It is preferred that R$^{a1}$ to R$^{a12}$ respectively represent a hydrogen atom, a halogen atom (preferably fluorine atom), a substituted or non-substituted alkyl group, a substituted or non-substituted aryl group or a substituted or non-substituted alkoxy group.

In the formulae, C$^{a1}$ and C$^{a2}$ respectively represent a substituted or non-substituted alkyl group, and preferably methyl, ethyl, propyl, butyl, pentyl or hexyl.

The dichroic dye which can be used in the present invention desirably selected from the group represented by a formula (2) or a formula (3) shown below.

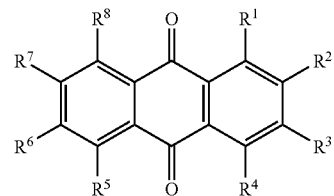

Formula (2)

In the formula, R$^1$ represents a substituent represented by —S—{(B$^1$)$_p$-(Q$^1$)$_q$—(B$^2$)$_r$}$_n$—C$^1$, in which S represents a sulfur atom, and B$^1$, B$^2$, Q$^1$, p, q, r and n have same definitions and same preferred ranges as in the formula (1). R$^2$, R$^3$, R$^4$, R$^5$, R$^6$, R$^7$ and R$^8$ respectively represent a hydrogen atom or a substituent.

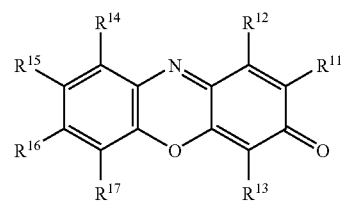

Formula (3)

In the formula, R$^{11}$, R$^{12}$, R$^{13}$, R$^{14}$, R$^{15}$, R$^{16}$, and R$^{17}$ each respectively represents a hydrogen atom or a substitutent, but at least one (preferably R$^{14}$) represents a substituent represented by —S—{(B$^1$)$_p$-(Q$^1$)$_q$—(B$^2$)$_r$}$_n$—C$^1$, wherein S represents a sulfur atom, and B$^1$, B$^2$, Q$^1$, p, q, r and n have same definitions and have same preferable ranges as in the formula (1).

A substituent represented by R$^2$, R$^3$, R$^4$, R$^5$, R$^6$, R$^7$ or R$^8$ can be the aforementioned substituent group V, and preferred examples of the substituent include a substituted or non-substituted C$_{6-80}$, desirably C$_{6-40}$ and more desirably C$_{6-30}$ arylthio group such as phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trifluoromethylphenylthio, 3-trifluoromethylphenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, or 4-propylphenyl-2-ethynyl-4'-biphenylthio); a substituted or non-substituted C$_{1-80}$, more desirably C$_{1-40}$ and much more desirably C$_{1-30}$ heteroarylthio group such as 2-pyridylthio, 3-pyridylthio, 4-pyridylthio, 2-quinolylthio, 2-furylthio or 2-pyrrolylthio; a substituted or non-substituted alkylthio group such as methylthio, ethylthio, butylthio or phenethylthio; a substituted or non-substituted amino group such as non-substituted amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino or N,N-ethylphenylamino; a halogen atom such as a fluorine atom or a chlorine atom; a substituted or non-substituted alkyl group such as methyl, or trifluoromethyl; a substituted or non-substituted alkoxy group such as mehtoxy, or trifluoromethoxy; a substituted or non-substituted aryl group such as phenyl; a substituted or non-substituted heteroaryl group such as 2-pyridyl; a substituted or non-substituted aryloxy group such as phenoxy; and a substituted or non-substituted heteroaryloxy group such as 3-thienyloxy.

$R^2$, $R^3$, $R^4$, $R^5$, $R^6$, $R^7$ and $R^8$ each is preferably a hydrogen atom, a fluorine atom, a chlorine atom or a hydroxy, or an arylthio group, an alkylthio group, an amino group, an alkylamino group, an arylamino group, an alkyl group, an aryl group, an alkoxy group or an aryloxy group each of which can be substituted or non-substituted. $R^2$, $R^3$, $R^4$, $R^5$, $R^6$, $R^7$ and $R^8$ each is more preferably a hydrogen atom, a fluorine atom or a hydroxy, or an arylthio group, an alkylthio group, an amino group, an alkylamino group or an arylamino group each of which can be substituted or non-substituted.

A substituent represented by $R^{11}$, $R^{12}$, $R^{13}$, $R^{14}$, $R^{15}$ or $R^{17}$ is preferably a halogen atom or a hydroxy, or an alkyl group, an aryl group, an alkylthio group, an arylthio group, a heterocyclic thio group, an alkoxy group, an aryloxy group, a carbamoyl group, an acyl group, an aryloxycarbonyl group, an alkoxycarbonyl group or an amide group each of which can be substituted or non-substituted. $R^{11}$, $R^{12}$, $R^{13}$, $R^{14}$, $R^{15}$, or $R^{17}$ is more preferably a hydrogen atom or a halogen atom, or an alkyl group, an arylthio group or an amide group each of which can be substituted or non-substituted.

$R^{16}$ is preferably a substituted or non-substituted amino group (including alkylamino or arylamino), a hydroxy, a mercapto group, a substituted or non-substituted alkylthio group, a substituted or non-substituted arylthio group, a substituted or non-substituted alkoxy group or a substituted or non-substituted aryloxy group, and particularly preferably a substituted or non-substituted amino group.

Examples of the dichroic dye, which can be used in the present invention, include, however not to be limited to, the compounds shown below.

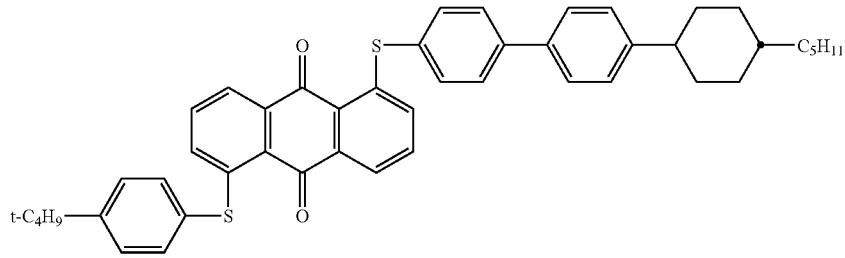

No. 1-1

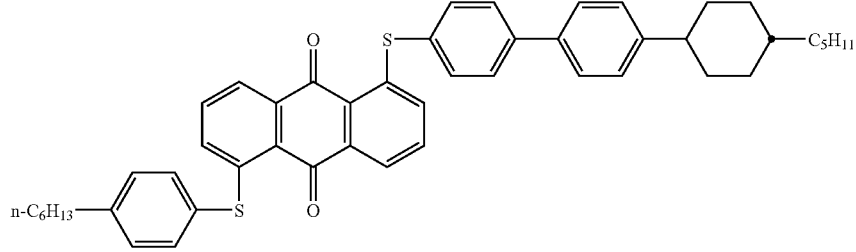

No. 1-2

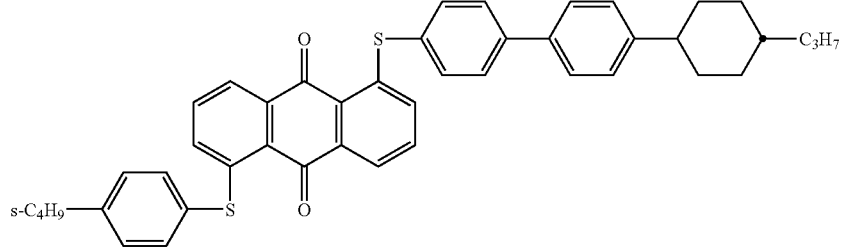

No. 1-3

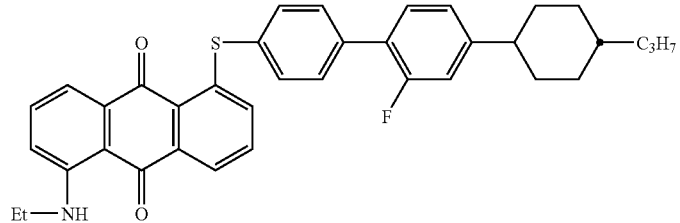

No. 1-4

-continued
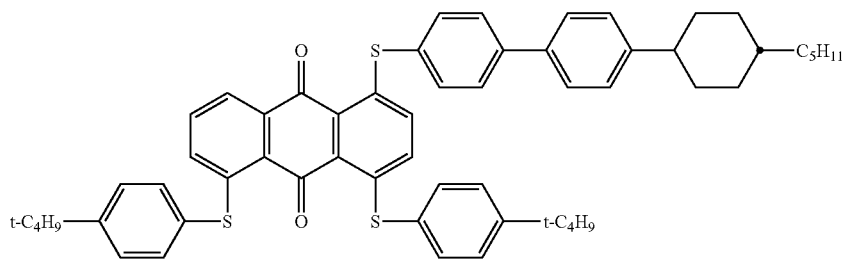
No. 1-5
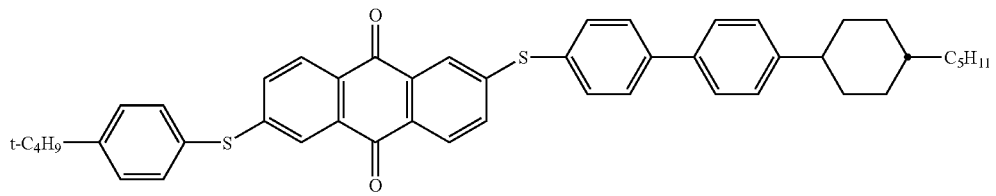
No. 1-6
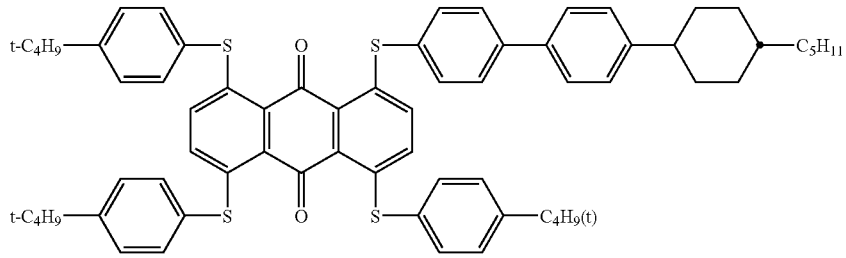
No. 1-7
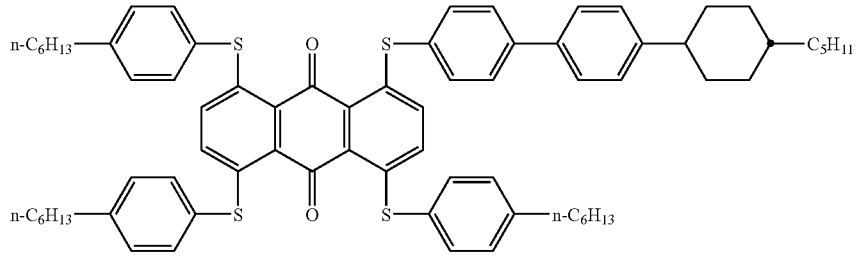
No. 1-8
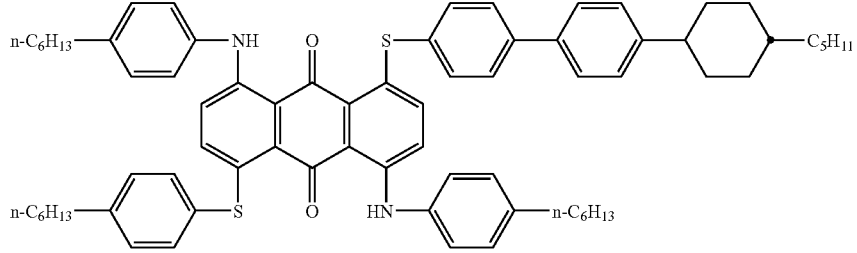
No. 1-9
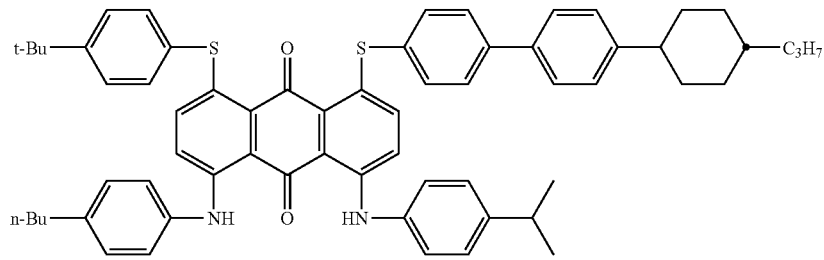
No. 1-10

-continued
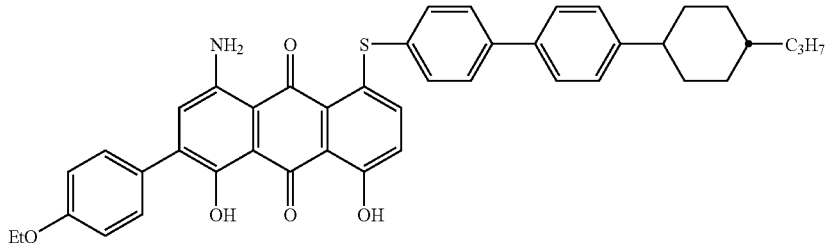
No. 1-11
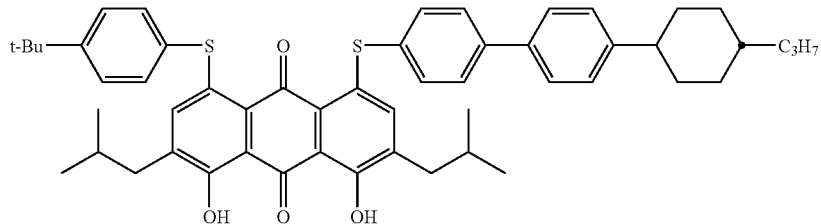
No. 1-12
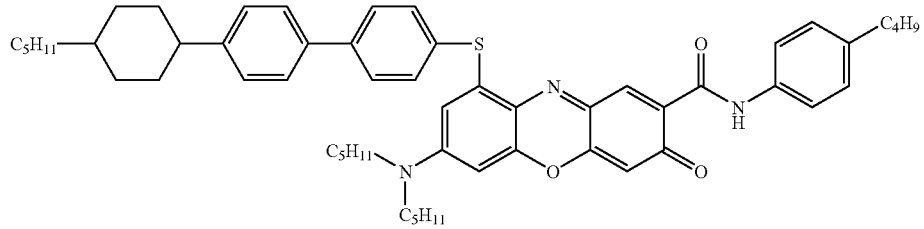
No. 1-13
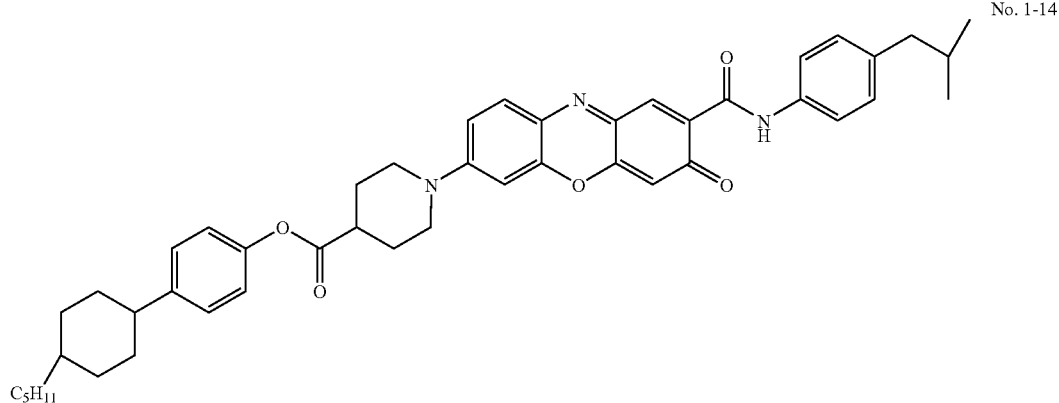
No. 1-14
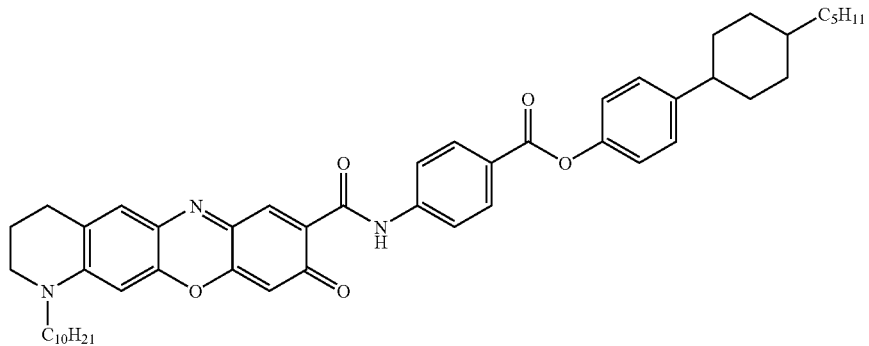
No. 1-15

-continued
No. 1-16
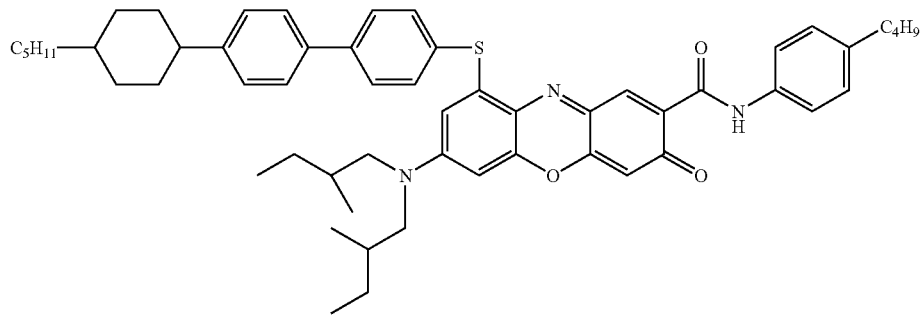
Examples of the dichroic azo dye, which can be used in the present invention, include, however not to be limited to, the compounds shown below.
No. 2-1
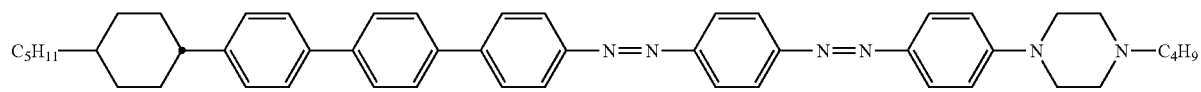
No. 2-2
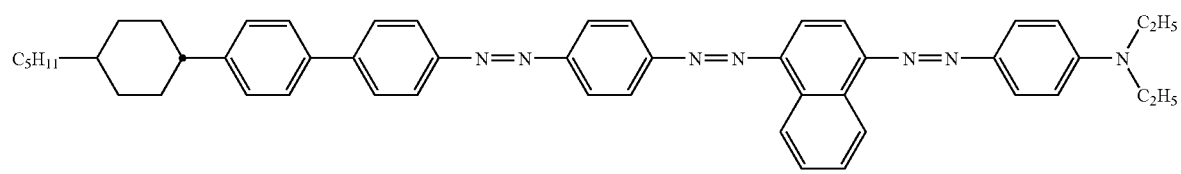
No. 2-3
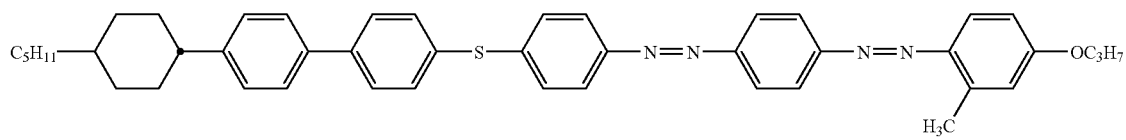
Examples of the dichroic dioxazine dye, which can be used in the present invention, include, however not to be limited to, the compounds shown below.
No. 3-1
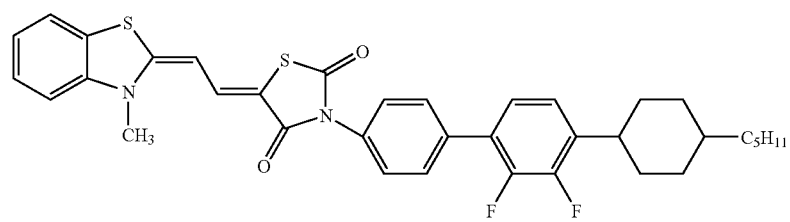
No. 3-2
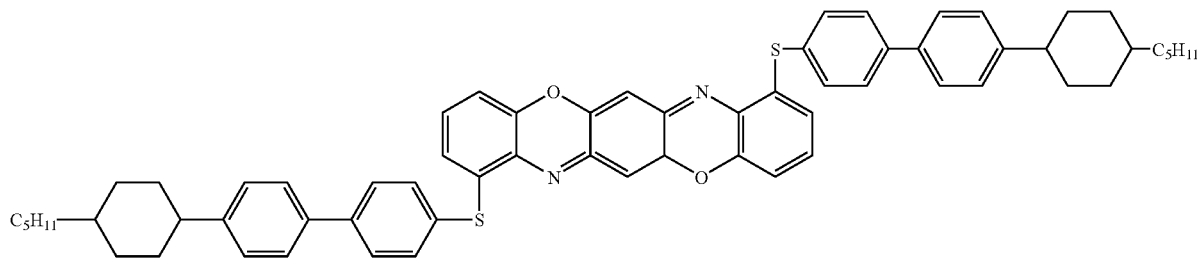

The dichroic dyes having a substituent represented by the formula (1) can be prepared according to combinations of known processes. For example, the dyes can be prepared according to the process described in JPA No. 2003-192664 or the like.

Next, a dual-frequency switchable smectic liquid crystal will be described in detail. The "dual-frequency switchable liquid crystal" means a liquid crystal exhibiting a positive dielectric anisotropy while being in an electric field of a low frequency range and exhibiting an inversion to a negative dielectric anisotropy while being in an electric field of a high frequency range, as detailedly described in *Liquid Crystal Device Handbook*, Japan Society for the Promotion of Science, Committee 142, p. 189–192 (1989), published by Nikkan Kogyo Shimbun). In the present invention, any dual-frequency switchable smectic liquid crystal can be used. Any types of such liquid crystals may be used in the present invention, and preferred examples of the liquid crystal include compounds having a molecular structure in which plural chlorophenyl skeletons or plural fluorophenyl skeletons are linked via ester bonds. The degree of order of a smectic phase, in usual, is higher than that of a nematic phase, and, thus, it is expected that a composition comprising a host liquid crystal of the smectic phase and a dichroic dye can give a higher order parameter, in comparison with a composition comprising a host liquid crystal of the nematic phase and the same dichroic dye. It is also expected that the smectic phase can have an ability to memorize the alignment, or, in other words, keep the alignment, when no electric field is applied. From view of the displaying quality, it is preferred that the dual-frequency switchable liquid crystal has a high order parameter, and, from the view of lowering the consumption of electric power, it is preferred that the dual-frequency switchable liquid crystal has an ability to memorize the alignment. And among such dual-frequency switchable liquid crystals, the dual-frequency switchable liquid crystals exhibit a smectic A phase are preferred. The composition of the present invention may comprise plural types of the dual-frequency switchable smectic liquid crystals. And the composition of the present invention may also comprise a smectic liquid crystal that does not show an inversion of the sign of the dielectric anisotropy between a low frequency region and a high frequency region of the applied electric field.

The composition of the present invention may comprise a compound not exhibiting a liquid crystalline property for the purpose of changing physical properties (such as a temperature range of the liquid crystal phase, a dielectric anisotropy, a refractive index anisotropy or a cross-over frequency). A cross-over frequency means a frequency at which the dielectric anisotropy of a dual-frequency switchable liquid crystal changes from positive to negative. The liquid crystal composition of the present invention may further comprise various additives such as a chiral agent, an ultraviolet absorber or an antioxidant. Examples of such additives include chiral agents for TN or STN mode, described in *Liquid Crystal Device Handbook*, Japan Society for the Promotion of Science, Committee 142, p. 199 to 202 (1989), Published by Nikkan Kogyo Shimbun).

In the composition of the invention, a ratio of the dichroic dye to the host liquid crystal may be selected arbitrarily, but is preferably 0.1 to 15 weight % and particularly preferably 0.5 to 6 weight %. Also a dye concentration, required for obtaining a desired optical density, is preferably determined by preparing a liquid crystal cell with the composition of the invention and by measuring an absorption spectrum of such liquid crystal cell. The liquid crystal composition of the present invention may be prepared by dissolving a dichroic dye and other additive compounds, to be added if necessary, in a host liquid crystal. The dissolving of the dichroic dye into the host liquid crystal can be achieved by a mechanical agitation, a heating, an ultrasonic wave application or a combination thereof.

The present invention also relates to a liquid crystal device comprising a liquid crystal layer comprising the composition of the present invention. The device of the present invention can have a high contrast quality and an ability to memorize, and, thus, can be driven with a low electric power. One embodiment of the device of the present invention comprises a pair of electrode substrates (at least one being preferably a transparent electrode substrate), and a liquid crystal layer comprising a liquid crystal composition of the invention, sandwiched between the pair of the electrode substrates. The electrode substrate may be produced by forming an electrode layer on a glass or plastic substrate. The plastic substrate may be formed of any polymer such as acrylic polymer, polycarbonate, epoxy resin, PES or PEN. The substrate is described for example in *Liquid Crystal Device Handbook*, Japan Society for the Promotion of Science, Committee 142, p. 218 to 231 (1989), Published by Nikkan Kogyo Shimbun). On the substrate, there is formed an electrode layer, which is preferably an transparent electrode. The electrode layer can be constituted for example indium oxide, indium tin oxide (ITO), or tin oxide. The transparent electrode can for example be those described in *Liquid Crystal Device Handbook*, Japan Society for the Promotion of Science, Committee 142, p. 232 to 239 (1989), Published by Nikkan Kogyo Shimbun).

The liquid crystal device of the invention can be prepared by forming a gap of 1 to 50 μm between the substrates for example by means of a spacer, and filling the gap with the liquid crystal composition of the invention. The employable spacer is described for example in *Liquid Crystal Device Handbook*, Japan Society for the Promotion of Science, Committee 142, p. 257 to 262 (1989), Published by Nikkan Kogyo Shimbun). The liquid crystal composition of the invention can be provided in a space between the substrates, by coating or printing on the substrate.

The liquid crystal device of the invention can be driven by a simple matrix drive method, or by an active matrix drive method utilizing for example a thin film transistor (TFT). Such drive methods are described in detail for example in *Liquid Crystal Device Handbook*, Japan Society for the Promotion of Science, Committee 142, p. 387 to 460 (1989), Published by Nikkan Kogyo Shimbun), and can be utilized for driving the liquid crystal device of the invention.

The liquid crystal device of the invention may be driven with voltages of a low frequency region and a high frequency region. A frequency range of the voltage to be applied to the liquid crystal layer is variable depending on a type of the liquid crystal to be employed, and a cross-over frequency of such liquid crystal, but, in general, is preferably within a range of 0.1 Hz to 10 MHz, and more preferably 1 Hz to 1 MHz. A frequency in the low frequency region is preferably 0.1 Hz to 100 kHz, more preferably 1 Hz to 10 kHz and further preferably 10 Hz to 10 kHz. Also a frequency in the high frequency region is preferably 100 Hz to 10 MHz, more preferably 100 Hz to 1 MHz and further preferably 1 kHz to 1 MHz.

The liquid crystal device of the invention may utilize a liquid crystal composition containing plural dichroic dyes. Also the liquid crystal composition may have any color. Also in case of forming a black-colored liquid crystal composition for example by mixing plural dichroic dyes, it can be utilized in a liquid crystal device for displaying white and black colors, or, in other words, an optical shutter, by a voltage application. It is also possible to prepare a liquid crystal device for color display by preparing liquid crystal compositions colored in red, green and blue and arranging such three compositions in parallel manner on a substrate. Also the liquid crystal device of the invention may have a laminate structure. For example there can be employed a three-layered structure respectively formed by yellow-, magenta- and cyan-colored liquid crystal compositions; and a two-layered structure constituted of a layer of a black-colored liquid crystal composition and a layer formed by a parallel arrangement of liquid crystal compositions of blue, green and red.

The liquid crystal device of the present invention can be utilized as a display of a computer, a watch, a calculator or the like; as an electron optical device such as an electron optical shutter, an electron optical valve, a selector switch of optical communication light path or a light modulator.

EXAMPLES

The following examples further illustrate the present invention. The materials, reagents, amounts and proportions thereof, procedures or the like shown in the following examples can be appropriately changed without departing from the spirit of the present invention. Therefore, the scope of the present invention is not limited to the specific examples shown below.

Example 1

<Synthesis of Dichroic Dye>

Dichroic dyes (1-1) and (1-8) were synthesized according to a method described in JPA No. 2003-192664 (the term "JPA" as used herein means an "unexamined published Japanese patent application (Kohkai Tokkyo Kohou)"). A dichroic dye (1-12) was synthesized according to a method described in the specification of Japanese Patent Application 2004-89769. A dichroic dye (1-13) and (1-14) were synthesized according to a method described in the specification of Japanese Patent Application No. 2004-50265. Dichroic dyes (Y-1), (M-1) and (C-1) were synthesized according to a method described in Jpn. J. Appl. Phys., vol. 37, p.3422 (1998).

dichroic dye described in Jpn. J. Appl. Phys., vol. 37, 3422 (1998)

Yellow Compound Y-1

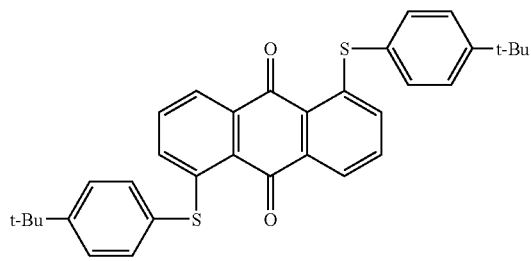

Magenta Compound M-1

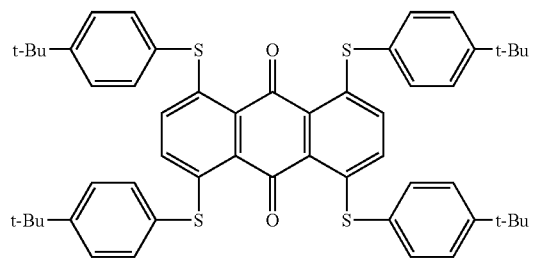

Cyan Compound C-1

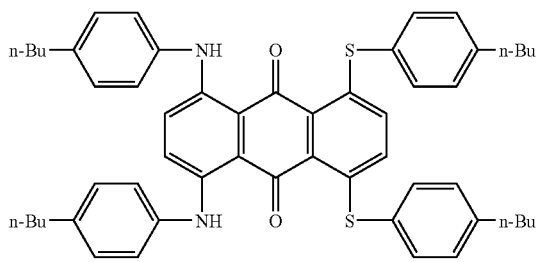

AS a dual-frequency switchable smectic liquid crystal, a liquid crystal mixture shown below was used.

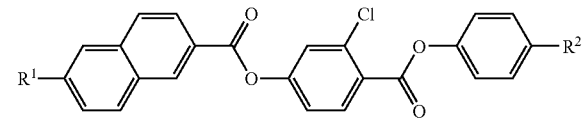

1 24 wt % 2 2 24 wt %
'28 wt % 4 24 wt %
1 $R^1=C_6H_{13}$, $R^2=C_5H_{11}$
2 $R^1=C_6H_{13}$, $R^2=C_{10}H_{21}$
3 $R^1=C_7H_{15}$, $R^2=C_5H_{11}$
4 $R^1=C_7H_{15}$, $R^2=C_{10}H_{21}$

A mixture of 1.5 mg of the dichroic dye (1-1) and 150 mg of the host liquid crystal shown above was heated for 1 hour on a hot plate of 80° C. The liquid crystal composition was cooled to the room temperature and was let to stand overnight. Various compositions respectively comprising the dichroic dyes shown in Table 1 were respectively prepared in the same manner.

<Preparation of Liquid Crystal Device>

A liquid crystal device was produced by pouring each of the liquid crystal compositions under heating in a commercially available liquid crystal cell, and cooling it. The liquid crystal cell employed was a glass substrate (thickness of 0.7 mm) manufactured by E. H. C. and bearing an ITO transparent electrode layer, and had a cell gap of 8 μm and an epoxy resin seal. Also on mutually opposed surfaces of the paired glass substrates, there were formed polyimide horizontal alignment layers with rubbing for achieving a parallel alignment of the sealed liquid crystal.

<Evaluation of Order Parameter>

Each produced liquid crystal device was irradiated with a polarized light parallel or perpendicular to the rubbing direction, and absorption spectra (A∥ and A⊥) were measured with an ultraviolet-visible spectrophotometer (UV2400PC, manufactured by Shimadzu Corp.). An order parameter "S" was determined according to a following equation 1 from A∥ and A⊥ at the wavelength of absorption peak:

$$S=(A\|-A\bot)/(A\|+2\cdot A\bot) \qquad \text{Equation 1}$$

Results of measurement are shown in Table 1. In Table 1, absorbance indicates the absorbance A∥ when irradiated with a polarized light parallel to the rubbing direction.

TABLE 1

| dichroic dye | absorbance | order parameter |
|---|---|---|
| 1-1 | 1.55 | 0.89 |
| 1-8 | 1.63 | 0.87 |
| 1-12 | 1.72 | 0.85 |
| 1-13 | 1.44 | 0.82 |
| 1-14 | 2.18 | 0.86 |
| Y-1 | 0.60 | 0.70 |
| M-1 | 0.38 | 0.78 |
| C-1 | 0.90 | 0.60 |

From the results in shown in Table 1, it is understandable that the exemplified compositions of the present invention gave a high order parameter. Among these, the liquid crystal composition comprising a dichroic dye having a substituent represented by the formula (1) gave a higher absorbance and a higher order parameter.

<Evaluation of Displaying Quality>

An absorbance of each prepared liquid crystal device while applied with a low frequency voltage, or, in other words, in a transparent state, and an absorbance of each prepared liquid crystal device while applied with a high frequency voltage, or, in other words, in a color state, were measured with a visible spectrophotometer (UV2400, manufactured by Shimadzu Corp.). And the ration of the absorbance in a color state to the absorbance in a transparent state (the absorbance in a color state/the absorbance in a transparent state) was calculated. In a transparent state, the voltage of 200 V with 50 Hz was applied and, in a color state, the voltage of 200 V with 500 kHz was applied.

TABLE 2

| dichroic dye | Dmax/Dmin |
|---|---|
| 1-1 | 19.0 |
| 1-8 | 17.8 |
| 1-14 | 18.0 |
| Y-1 | 8.0 |
| M-1 | 10.1 |

From the results shown in Table 2, it is understandable that the exemplified liquid crystal devices of the invention could be driven by two voltages respectively having high and low frequencies, and gave a higher concentration ratio; and that, among these, the exemplified liquid crystal devices employing a dichroic dye having a substituent represented by the formula (1) gave a higher concentration ratio.

Each exemplified liquid crystal devices was disposed on a scatter white plate, and in a transparent state, it gave white based on scattering. It is supposed that liquid crystal device of the present invention gives the white background based on scattering, which is similar to a paper, and has a high level of visibility.

INDUSTRIAL APPLICABILITY

According to the present invention, it is possible to provide a liquid crystal composition which can be widely used for producing liquid-crystal devices, preferably used for producing liquid crystal device employing a GH mode. A liquid crystal device employing a GH mode produced by employing the liquid crystal composition of the present invention can have a high displaying quality and a high level of visibility.

The invention claimed is:

1. A liquid crystal composition comprising:
   at least one dual-frequency switchable smectic liquid crystal, and at least one dichroic dye;
   wherein the dichroic dye is represented by a formula (3):

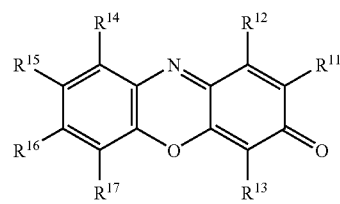

Formula (3)

where $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by $-S-\{(B^1)_p-(Q^1)_q-(B^2)_r\}_n-C^1$, in which S represents a sulfur atom: $B^1$ and $B^2$ respectively represent a substituted or non-substituted arylene group, heteroarylene group or divalent cyclic aliphatic hydrocarbon group: $Q^1$ represents a divalent linking group: $C^1$ represents a substituted or non-substituted alkyl group, cycloalkyl group, alkoxy group, alkoxycarbonyl group, acyl group or acyloxy group; p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p\text{-}(Q^1)_q-(B^2)_r\}$ present in two or more units may be same or different to each other.

2. The liquid crystal composition of claim 1, wherein $R^{14}$ is a substituent represented by $-S-\{(B^1)_p\text{-}(Q^1)_q-(B^2)_r\}_n-C^1$.

3. The liquid crystal composition of claim 1, wherein the dual-frequency switchable smectic liquid crystal exhibits a smectic A phase.

4. The liquid crystal composition of claim 1, wherein $-\{(B^1)_p\text{-}Q^1)_q-(B^2)_r\}-C^1$ is a substituent represented by a formula (a-1) or a formula (a-2);

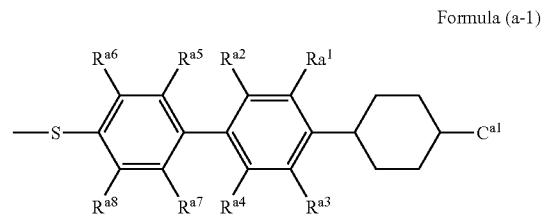

Formula (a-1)

-continued

Formula (a-2)

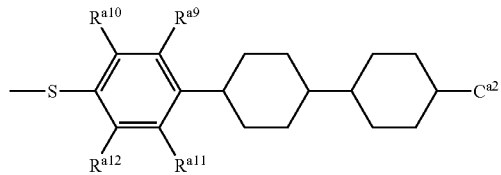

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$, and $R^{a12}$ respectively represent a hydrogen atom or a substituent; and $C^{a1}$ and $C^{a2}$ respectively represent a substituted or non-substituted alkyl group.

5. A liquid crystal device comprising:
a pair of electrodes of which at least one is a transparent electrode, and a liquid crystal layer between the pair of electrodes comprising a liquid crystal composition comprising at least one dual-frequency switchable smectic liquid crystal and at least one dichroic dye;
wherein the dichroic dye is represented by a formula (3):

Formula (3)

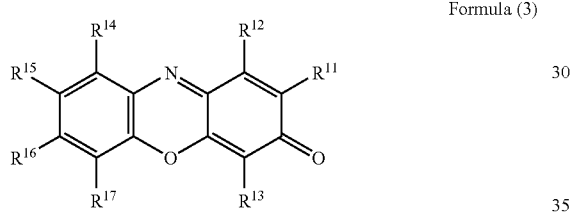

wherein $R^{11}$, $R^{12}$, $R^{13}$, $R^{14}$, $R^{15}$, $R^{16}$, and $R^{17}$ respectively represent a hydrogen atom or a substituent, provided that at least one represents a substituent represented by —S—{$(B^1)_p$-$(Q^1)_q$—$(B^2)_r$}$_n$—$C^1$, in which S represents a sulfur atom: $B^1$ and $B^2$ respectively represent a substituted or non-substituted arylene group, heteroarylene group or divalent cyclic aliphatic hydrocarbon group: $Q^1$ represents a divalent linking group: $C^1$ represents a substituted or non-substituted alkyl group, cycloalkyl group, alkoxy group, alkoxycarbonyl group, acyl group or acyloxy group; p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, {$(B^1)_p$-$(Q^1)_q$—$(B^2)_r$} present in two or more units may be same or different to each other.

6. The liquid crystal device of claim 5, wherein $R^{14}$ is a substituent represented by —S—{$(B^1)_p$-$(Q^1)_q$—$(B^2)_r$}$_n$—$C^1$.

7. The liquid crystal device of claim 5, wherein the dual-frequency switchable smectic liquid crystal exhibits a smectic A phase.

8. The liquid crystal device of claim 5, wherein —{$(B^1)_p$-$(Q^1)_q$—$B^2)_r$}—$C^1$ is a substituent represented by a formula (a-1) or a formula (a-2);

Formula (a-1)

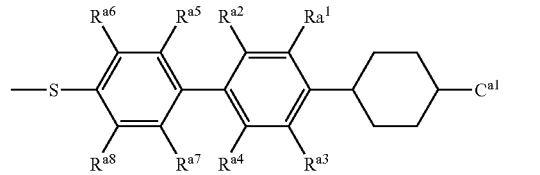

Formula (a-2)

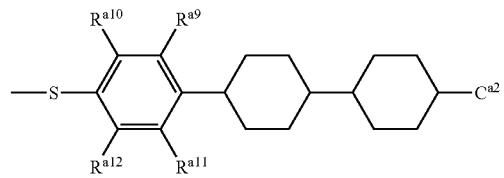

wherein S is a sulfur atom, $R^{a1}$, $R^{a2}$, $R^{a3}$, $R^{a4}$, $R^{a5}$, $R^{a6}$, $R^{a7}$, $Ras^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

9. A liquid crystal composition comprising:
at least one dual-frequency switchable smectic liquid crystal, and at least one dichroic dye wherein the dichroic dye is represented by a formula (2):

Formula (2)

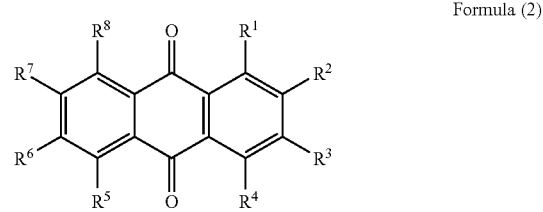

where $R^1$ represents a substituent represented by —S—{$(B^1)_p(Q^1)_q$—$(B^2)_r$}$_n$—$C^1$, in which S represents a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, Q1 or $B^2$ present in two or more units may be same or different to each other; and, in case n is equal to or larger than 2, {$(B^1)_p$-$(Q^1)_q$—$(B^2)_r$} present in two or more units may be same or different to each other; $R^2$, $R^3$, $R^4$, $R^5$, $R^6$, $R^7$ and $R^8$ respectively represent a hydrogen atom, a fluorine atom, a chlorine atom, a hydroxy, an optionally substituted hydrocarbon arylthio group, an optionally substituted alkylthio group, an optionally substituted amino group, an optionally substituted alkylamino group, an optionally substituted arylamino group, an optionally substituted alkyl group, an optionally substituted aryl group, an optionally substituted alkoxy group or an optionally substituted aryloxy group.

10. The liquid crystal composition of claim 9, wherein $R^2$, $R^3$, $R^4$, $R^5$, $R^6$, $R^7$ and $R^8$ respectively represent a hydrogen atom, a fluorine atom, a hydroxy, an optionally substituted hydrocarbon arylthio group, an optionally substituted alkyithio group, an optionally substituted amino group, an optionally substituted alkylamino group or an optionally substituted arylamino group.

11. The liquid crystal composition of claim 9, wherein the dual-frequency switchable smectic liquid crystal exhibits a smectic A phase.

12. The liquid crystal composition of claim 9, wherein $-\{(B^1)_p(Q^1)_q-(B^2)_r\}-C^1$ is a substituent represented by a formula (a-1) or a formula (a-2);

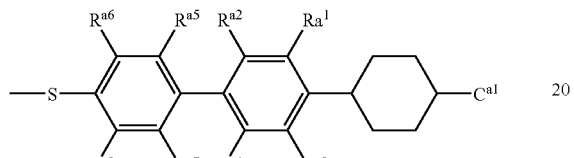

Formula (a-1)

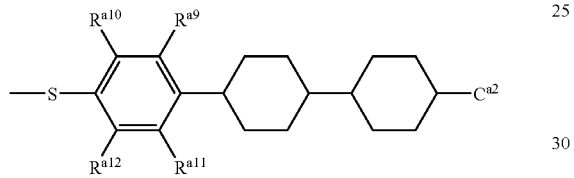

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

13. A liquid crystal device comprising:
a pair of electrodes of which at least one is a transparent electrode, and
a liquid crystal layer between the pair of electrodes comprising a liquid crystal composition comprising at least one dual-frequency switchable smectic liquid crystal and at least one dichroic dye
wherein the dichroic dye is represented by a formula (2):

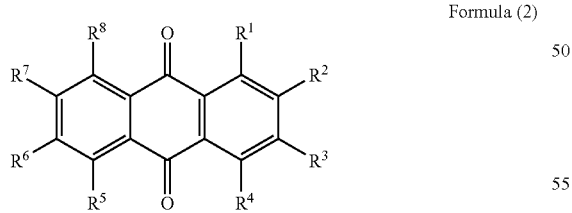

Formula (2)

where $R^1$ represents a substituent represented by $-S-\{(B^1)_p(Q^1)_q-(B^2)_r\}_n-C^1$, in which S represents a sulfur atom; $B^1$ and $B^2$ respectively represent a substituted or non-substituted arylene group, heteroarylene group or divalent cyclic aliphatic hydrocarbon group; $Q^1$ represents a divalent linking group; $C^1$ represents a substituted or non-substituted alkyl group, cycloalkyl group, alkoxy group, alkoxycarbonyl group, acyl group or acyloxy group; p, q and r respectively represent an integer from 0 to 5; and n represents an integer from 1 to 3, provided that a total number of groups represented by $B^1$ and $B^2$ is from 3 to 10; in case any of p, q and r is equal to or larger than 2, $B^1$, $Q^1$ or $B^2$ present in two or more units may be same or different to each other; and, in case n is equal to or larger than 2, $\{(B^1)_p-(Q^1)_q-(B^2)_r\}$ present in two or more units may be same or different to each other; $R^2$, $R^3$, $R^4$, $R^5$, $R^6$, $R^7$ and $R^8$ respectively represent a hydrogen atom, a fluorine atom, a chlorine atom, a hydroxy, an optionally substituted hydrocarbon arylthio group, an optionally substituted alkylthio group, an optionally substituted amino group, an optionally substituted alkylamino group, an optionally substituted arylamino group, an optionally substituted alkyl group, an optionally substituted aryl group, an optionally substituted alkoxy group or an optionally substituted aryloxy group.

14. The liquid crystal device of claim 13, wherein the dual-frequency switchable smectic liquid crystal exhibits a smectic A phase.

15. The liquid crystal device of claim 13, wherein $-\{(B^1)_p-(Q^1)_q-B^2)_r\}-C^1$ is a substituent represented by a formula (a-1) or a formula (a-2);

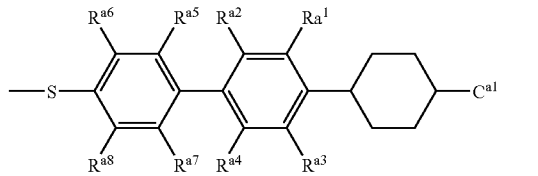

Formula (a-1)

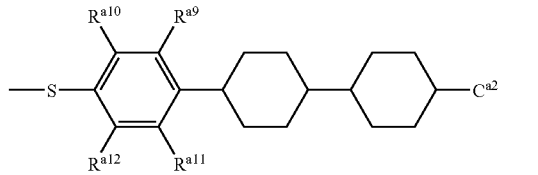

Formula (a-2)

wherein S is a sulfur atom, $R^{a1}$, $R^{a2}$, $R^{a3}$, $R^{a4}$, $R^{a5}$, $R^{a6}$, $R^{a7}$, $R^{a8}$, $R^{a9}$, $R^{a10}$, $R^{a11}$ and $R^{a12}$ respectively represent a hydrogen atom or a substituent; and $C^{a1}$ and $C^{a2}$ respectively represent a substituted or non-substituted alkyl group.

* * * * *